(12) United States Patent
Taya et al.

(10) Patent No.: US 8,691,357 B2
(45) Date of Patent: *Apr. 8, 2014

(54) PRESSURE-SENSITIVE ADHESIVE SHEET FOR OPTICAL DATA RECORDING MEDIUM, OPTICAL DATA RECORDING MEDIUM, AND METHOD AND DEVICE FOR REPRODUCING DATA FROM OPTICAL DATA RECORDING MEDIUM

(75) Inventors: Naoki Taya, Tokyo (JP); Takehito Nakayama, Tokyo (JP); Hideharu Tajima, Osaka (JP); Yasuhiro Harada, Osaka (JP); Masaki Yamamoto, Osaka (JP); Hirohisa Yamada, Osaka (JP)

(73) Assignees: Lintec Corporation, Tokyo (JP); Sharp Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/497,866

(22) PCT Filed: Sep. 27, 2010

(86) PCT No.: PCT/JP2010/066718
§ 371 (c)(1),
(2), (4) Date: May 23, 2012

(87) PCT Pub. No.: WO2011/040375
PCT Pub. Date: Apr. 7, 2011

(65) Prior Publication Data
US 2012/0246666 A1    Sep. 27, 2012

(30) Foreign Application Priority Data
Oct. 1, 2009   (JP) .................... 2009-229912

(51) Int. Cl.
*G11B 7/24*        (2013.01)
(52) U.S. Cl.
USPC ................ 428/64.1; 428/64.4; 428/355 AC

(58) Field of Classification Search
USPC ........................... 428/64.4, 355 AC
See application file for complete search history.

(56) References Cited

U.S. PATENT DOCUMENTS

| 2006/0153057 A1 | 7/2006 | Miyata et al. |
| 2008/0310293 A1 | 12/2008 | Watanabe et al. |

FOREIGN PATENT DOCUMENTS

| JP | 05-12673 A | 1/1993 |
| JP | 05-12715 A | 1/1993 |

(Continued)

OTHER PUBLICATIONS

International Search Report mailed on Oct. 26, 2010 for the corresponding International patent application No. PCT/JP2010/066718.

*Primary Examiner* — Elizabeth Mulvaney
(74) *Attorney, Agent, or Firm* — Posz Law Group, PLC

(57) ABSTRACT

A pressure-sensitive adhesive sheet 1 for an optical data recording medium D1 from which a signal with a mark length shorter than the resolution limit of an optical system of a reproducing device is capable of being reproduced by reproduction light emitted during reproducing, the pressure-sensitive adhesive sheet 1 having an adhesive transparent resin layer 11 to be disposed on an data recording layer 3 of the optical data recording medium D1, the transparent resin layer 11 having a (meth)acrylate copolymer containing no acidic group as a main component, the transparent resin layer 11 having a storage elastic modulus at 23° C. of $1.5 \times 10^5$ Pa or less and a gel fraction of 68 wt % or more. The transparent resin layer 11 of this pressure-sensitive adhesive sheet 1 for an optical data recording medium can be used for producing an optical data recording medium which can reproduce from a mark with a length shorter than the resolution of an optical system of a reproducing device, and which is stable against changes in the external environment when responding to status of use.

16 Claims, 2 Drawing Sheets

(56) References Cited

FOREIGN PATENT DOCUMENTS

| | | |
|---|---|---|
| JP | 2002-241711 A | 8/2002 |
| JP | 2004-220747 A | 8/2004 |
| JP | 2004-362718 A | 12/2004 |
| JP | 2005-325250 A | 11/2005 |
| JP | 2006-188630 A | 7/2006 |
| JP | 2006-302494 A | 11/2006 |
| JP | 2007-226856 A | 9/2007 |
| JP | 2008-300007 A | 12/2008 |
| JP | 2009-9684 A | 1/2009 |

PRESSURE-SENSITIVE ADHESIVE SHEET FOR OPTICAL DATA RECORDING MEDIUM, OPTICAL DATA RECORDING MEDIUM, AND METHOD AND DEVICE FOR REPRODUCING DATA FROM OPTICAL DATA RECORDING MEDIUM

CROSS REFERENCE TO RELATED APPLICATIONS

This application is a U.S. national stage application of PCT/JP2010/066718 filed on Sep. 27, 2010, and claims priority to, and incorporates by reference, Japanese Patent Application No. 2009-229912 filed on Oct. 1, 2009.

TECHNICAL FIELD

The present invention relates to an optical data recording medium to which data is optically recorded and from which data is optically reproduced, a pressure-sensitive adhesive sheet used for producing the optical data recording medium, and an optical data recording medium reproducing method and an optical data recording medium reproducing device for reproducing data from the optical data recording medium.

BACKGROUND ART

Recently, optical data recording media are required more and more to be enhanced with their data recording density in order for the increased data quantity such as video pictures to be processed. One of solution approaches thereto is a super-resolution technique. The super-resolution technique is a technique for reproducing data from marks (marks herein are intended to mean pre-pits as well as recording marks generated when data is recorded to a recording type optical data recording medium) which have a length equal to or shorter than the optical resolution limit involved in a reproducing device (the limit is determined in accordance with the laser wavelength and numerical aperture of the optical system), and this technique thus allows for recording with short length marks thereby to substantially increase the data recording density.

To this end, various optical data recording media have been heretofore proposed to reproduce data from shorter length marks than the optical system resolution limit involved in a reproducing device (such optical data recording media will be referred to as "super-resolution media (medium)" hereinafter). Patent Document 1 and Patent Document 2 describe, as one or more examples, approaches for substantially reducing the spot diameter by forming a mask layer in an optical data recording medium.

Specifically, Patent Document 1 discloses an optical disc device for performing recording and reproducing through using reflectivity changes caused by pre-pits having convexoconcaves formed on the substrate of an optical disc medium, wherein a temperature dependent optical shatter layer is formed on a medium layer recorded therein with signals (the side of disc surfaces to which laser beam is to be irradiated from the objective lens) such that the shatter layer absorbs the reproduction laser beam at room temperature but is disabled to absorb the reproduction laser beam due to the increase in temperature caused by the reproduction laser power while on the other hand absorbing the reproduction laser beam due to the decrease in temperature after passing reproducing focus spots.

Patent Document 1 also discloses an optical disc device for performing recording and reproducing of data through using reflectivity changes caused by phase transition in a recording material, wherein a temperature dependent optical shatter layer is formed on a medium layer recorded therein with data (the side of disc surfaces to which laser beam is to be irradiated from the objective lens) such that the shatter layer absorbs the reproduction laser beam at room temperature but is disabled to absorb the reproduction laser beam due to the increase in temperature caused by the reproduction laser power while on the other hand absorbing the reproduction laser beam due to the decrease in temperature after passing reproducing focus spots.

On the other hand, Patent Document 2 discloses an optical data recording medium having a recording film on a substrate, wherein the recording film is provided therein with an optical shatter layer which is disposed at the front-end location in terms of incident reading light or recording light and which contains a thermochromism substance as a main component, which is in a chromogenic status not transmitting light before the reading light is irradiated while the center area of the irradiated region is partially extinguished in color to be optically transparent in accordance with an increase in temperature due to the irradiation of reading light.

These approaches involve mask layers (optical shatter layers) formed of substances, such as thermochromism material and phase transition material, which are to melt when the temperature is increased up to a certain value or higher, thereby exhibiting mask effects. A substance in molten status has a high fluidity, so that the composition and shape in the initial status are easily to change. Consequently, in an optical data recording medium having a mask layer capable of exhibiting the mask effect when the temperature increases up to a certain temperature or higher, if repeating the recording and/or the reproducing, then a problem occurs that the mask effect is steadily reduced due to the shift in composition or shape of the mask layer and substantially lost after repeating around several thousand times. The above conventional optical data recording medium is thus insufficient in durability.

As a method for solving this problem, Patent Document 3 and Patent Document 4 disclose an invention using as a mask layer a metal oxide which changes its reflectivity and/or transmissivity in response to the change in temperature. Patent Document 3 and Patent Document 4 also describe that the mask effect is prevented from deterioration even if repeating the recording and/or the reproducing, by forming the mask layer of a substance, such as a metal oxide (preferably zinc oxide), which does not melt due to the increase in temperature during the recording and/or the reproducing.

Further, Patent Document 5 describes that a layer to contact the data recording layer as the mask layer is preferred to have a low thermal conductivity in order to accelerate the temperature rising and that a transparent resin layer is preferred to be interposed between a light permeable base material film and an data recording layer to combine them.

Incidentally, the optical data recording medium as described in Patent Document 5 is configured such that the light permeable base material film, the transparent resin layer, the data recording layer, and a substrate are laminated, and the mask layer forming the data recording layer is continuously to contact the transparent resin layer. Accordingly, the functionality of the transparent resin layer is required to involve an embedding capability (following capability) to the data recording layer having convexoconcaves while sufficiently maintaining an adhesion with a metal oxide forming the data recording layer and further not to negatively affect the metal oxide.

In general, as a means for improving the adhesion with metal, a method is employed which makes an acidic group be contained in the component in the transparent resin layer. In this case, however, corrosion may be caused in the metal oxide film contacting the transparent resin layer particularly under high temperature and high humidity. If, on the other hand, an acidic group is incorporated, then corrosion may be suppressed, but, conversely, the adherence to metal is drastically reduced.

As a method to solve this problem, Patent Document 6 proposes to use a pressure-sensitive adhesive agent which contains no carboxyl group-containing co-polymerizable monomer but contains a nitrogen atom-containing co-polymerizable monomer. However, with respect to (meth)acrylate copolymer synthesized according to Patent Document 6, the behavior of the properties of the transparent resin layer is not mentioned at all, and if employing the configuration as mentioned in embodiments thereof, then cracks may occur during rapid environmental changes in the film of metal oxide which forms the data recording layer.

PRIOR ART DOCUMENTS

Patent Documents

[Patent Document 1] Published Patent Application No. H5-12673 (1993)
[Patent Document 2] Published Patent Application No. H5-12715 (1993)
[Patent Document 3] Published Patent Application No. 2004-220747
[Patent Document 4] Published Patent Application No. 2004-362718
[Patent Document 5] Published Patent Application No. 2006-302494
[Patent Document 6] Published Patent Application No. 2005-325250

SUMMARY OF THE INVENTION

Problems to be Solved by the Invention

In the light of such problems, objects of the present invention include providing an optical data recording medium which is capable of reproducing data from marks (marks herein are intended to mean pre-pits as well as recording marks generated when data is recorded to a recording type optical data recording medium) with a length shorter than the optical resolution limit involved in a reproducing device and which is stable for changes in the external environment when responding to status of use, a pressure-sensitive adhesive sheet having an adhesive transparent resin layer which sheet is used for producing the optical data recording medium, and an optical data recording medium reproducing method and an optical data recording medium reproducing device for reproducing data from the optical data recording medium.

Means for Solving the Problems

In order to achieve the above objects, as a first group of inventions, there is provided a pressure-sensitive adhesive sheet for an optical data recording medium from which a signal with a mark length shorter than a resolution limit of an optical system of a reproducing device is capable of being reproduced by reproduction light irradiated during reproducing, the pressure-sensitive adhesive sheet having an adhesive transparent resin layer to be disposed on an data recording layer of the optical data recording medium, the transparent resin layer having a (meth)acrylate copolymer containing no acidic group as a main component, the transparent resin layer having a storage elastic modulus at 23° C. of $1.5 \times 10^5$ Pa or less and a gel fraction of 68 wt % or more (Invention 1).

In the present description, the "pressure-sensitive adhesive sheet" is a layer which includes an adhesive transparent resin layer and which may comprise a single layer or plural layers. In addition, the shape of the pressure-sensitive adhesive sheet is not particularly limited, and it may be configured as being roll-shaped after laminating the transparent resin layer and other base material (e.g. protective sheet), or configured as being interposed between two release films without any base material. In the present description, the "data recording layer" denotes a layer which has a functionality of reproducing data from marks with a length shorter than the optical resolution limit involved in a reproducing device, and the data recording layer includes a metal layer and/or metal oxide layer and may comprise a single layer or plural layers. In the present description, the "optical data medium" is intended to mean a medium to which data can be optically recorded and from which data can be optically reproduced, and a reproduction-only, write-once or rewritable disc-like medium primarily corresponds to the optical data medium. Specific examples thereof include, such as, but not limited to, CD-ROM, CD-R, CD-RW, DVD-ROM, DVD-R, DVD-RW, DVD-RAM, and Blu-ray Disc.

According to the above invention (Invention 1), due to the transparent resin layer satisfying the aforementioned conditions, the data recording layer adjacent to the transparent resin layer can be prevented from cracking or other troubles, even if the obtained optical data recording medium is left under high temperature and/or high humidity or even in a case in which there occur rapid temperature changes and/or humidity changes. Consequently, according to the above invention (Invention 1), an optical data recording medium can be obtained which allows for reproducing from marks with a length shorter than the optical resolution limit involved in a reproducing device and which is stable for changes in the external environment.

In the above invention (Invention 1), it is preferred that the (meth)acrylate copolymer contains methyl(meth)acrylate as a monomer component (Invention 2).

In the above inventions (Inventions 1, 2), it is preferred that the (meth)acrylate copolymer includes a nitrogen atom-containing copolymerizable monomer as a monomer component (Invention 3).

In the above inventions (Inventions 1 to 3), it is preferred that the pressure-sensitive adhesive sheet for an optical data recording medium further comprises a protective layer (Invention 4).

As a second group of inventions, there is provided an optical data recording medium, wherein the pressure-sensitive sheet for the above-described optical data recording medium (Inventions 1 to 4) is disposed on a data recording layer (Invention 5).

In the above invention (Invention 5), it is preferred that a protective layer, the transparent resin layer, the data recording layer, and a substrate are disposed in layers in this order from an incident plane-side on which reproduction light is incident during reproducing (Invention 6).

As a third group of inventions, there is provided a method for reproducing data from an optical data recording medium, wherein the method is characterized by using the optical data recording medium (Invention 5, 6) (Invention 7).

As a fourth group of inventions, there is provided an device for driving an optical data recording medium, wherein the device is characterized by using the optical data recording medium (Invention 5, 6) (Invention 8).

Advantageous Effect of the Invention

According to the present invention, an optical data recording medium can be obtained which allows for reproducing data from marks with a length equal to or shorter than the optical resolution limit involved in a reproducing device and which is stable for changes in the external environment.

EMBODIMENTS FOR CARRYING OUT THE INVENTION

Hereinafter, embodiments of the present invention will be described.

{Sheet for Producing Optical Data Recording Medium}

Figure 1:
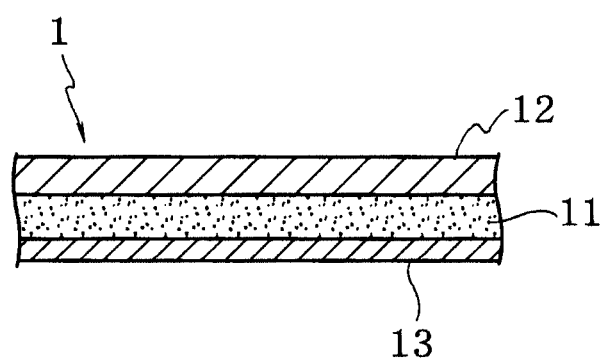
FIG. 1 is a cross-sectional view of a pressure-sensitive adhesive sheet for an optical data recording medium according to one embodiment of the present invention.

FIG. 1 is a cross-sectional view of a pressure-sensitive adhesive sheet for an optical data recording medium according to one embodiment of the present invention. The pressure-sensitive adhesive sheet for an optical data recording medium according to the present embodiment is, such as, but not limited to, for protecting an data recording layer in the optical data recording medium.

Pressure-sensitive adhesive sheet for optical data recording medium 1 according to the present embodiment shown in FIG. 1 comprises a transparent resin layer 11, a protective sheet (protective layer) 12 disposed in layers on one surface (the upper surface in FIG. 1) of the transparent resin layer 11, and a release sheet 13 disposed in layers on the other surface (the lower surface in FIG. 1) of the transparent resin layer 11. Note that the protective sheet 12 is to be a protective layer in the optical data recording medium and the release sheet 13 is to be removed when using the pressure-sensitive adhesive sheet for optical data recording medium 1.

The transparent resin layer 11 in the present embodiment is used for causing an data recording layer 3 (refer to FIG. 2) formed on a substrate 2 of the optical data recording medium and the protective sheet 12 to adhere with each other. As such, it is preferred that the transparent resin layer 11 is a layer comprising a pressure-sensitive adhesive. This transparent resin layer 11 requires to has a (meth)acrylate copolymer containing no acidic group as a main component, and also requires that the transparent resin layer has a storage elastic modulus at 23° C. of $1.5 \times 10^5$ Pa or less and a gel fraction of 68 wt % or more. Satisfying these conditions allows the data recording layer 3 adjacent to the transparent resin layer 11 to be prevented from cracking or other troubles even if the obtained optical data recording medium is left under high temperature and/or high humidity or even in a case in which there occur rapid temperature changes and/or humidity changes. Consequently, according to the pressure-sensitive adhesive sheet for optical data recording medium 1, which has the above transparent resin layer 11, an optical data recording medium can be produced which is stable for changes in the external environment.

As previously described, the transparent resin layer 11 requires to have a (meth)acrylate copolymer containing no acidic group as a main component. The (meth)acrylate copolymer, which is a polymer containing a (meth)acrylate monomer as a constituent component, has advantages for optics applications, and the previously described conditions for the storage elastic modulus and the gel fraction may be satisfied by appropriately selecting and adjusting the type of monomer and its compounding ratio and degree of crosslinking. In addition, the (meth)acrylate copolymer contains no acidic group. If an acidic group is contained, then the adhesion of the transparent resin layer 11 to the data recording layer 3 is improved, but the data recording layer 3 comes to easily corrode thereby causing errors in reading to occur.

The storage elastic modulus at 23° C. of the transparent resin layer 11 requires to be $1.5 \times 10^5$ Pa or less, and preferably $1.3 \times 10^5$ Pa or less. If the storage elastic modulus exceeds $1.5 \times 10^5$ Pa, then, in the case where rapid changes in temperature and/or humidity are caused in the environment for the obtained optical data recording medium or in other cases, the data recording layer 3 adjacent to the transparent resin layer 11 incurs cracks thereby to lose the functionality as an optical data recording medium.

Although the lower limit for the storage elastic modulus of the transparent resin layer 11 at 23° C. is not particularly restricted from the above perspective of preventing cracks, it is preferably $1.0 \times 10^3$ Pa or more, and more preferably $1.0 \times 10^4$ Pa or more. If the storage elastic modulus is $1.0 \times 10^3$ Pa or more, then the holding capability for the protective sheet 12 laminated on the transparent resin layer 11 is enhanced.

The gel fraction of the transparent resin layer 11 requires to be 68 wt % or more, and preferably 74 wt % or more. If the gel fraction of the transparent resin layer 11 is less than 68 wt %, then the reproducing sensitivity of the obtained optical data recording medium will be reduced.

Although the upper limit for the gel fraction of the transparent resin layer 11 is not particularly restricted from the above perspective of preventing cracks, it is preferably 95 wt % or less, and more preferably 85 wt % or less. If the gel fraction of the transparent resin layer 11 exceeds 95 wt %, then the transparent resin layer 11 loses the tack thereby an adhesion to the data recording layer 3 is not readily obtained.

This gel fraction may be adjusted by the degree of crosslinking during the production of resin component forming the transparent resin layer 11 having a (meth)acrylate copolymer as a main component.

Note that measuring methods for the above storage elastic modulus and the gel fraction conform to those for examples as will be described later.

An alkyl(meth)acrylate monomer for forming a (meth)acrylate copolymer will then be described. The alkyl(meth)acrylate monomer is an alkyl(meth)acrylate having an alkyl ester moiety having from 1 to 20 carbon atoms, and is preferably the alkyl(meth)acrylate having an alkyl ester moiety having from 1 to 12 carbon atoms. Specifically, examples thereof include methyl(meth)acrylate, ethyl(meth)acrylate, propyl(meth)acrylate, n-butyl(meth)acrylate, isobutyl(meth)acrylate, t-butyl(meth)acrylate, pentyl(meth)acrylate, hexyl(meth)acrylate, cyclohexyl(meth)acrylate, 2-ethylhexyl(meth)acrylate, isooctyl(meth)acrylate, decyl(meth)acrylate, dodecyl(meth)acrylate, myristyl(meth)acrylate, palmityl(meth)acrylate, stearyl(meth)acrylate, and other compounds, and each may be used alone or two or more kinds may be used in combination.

The ratio of the above alkyl(meth)acrylate monomer to whole monomers forming the (meth)acrylate copolymer is preferably 70 to 97 wt %, and more preferably 75 to 95 wt %. If the ratio of alkyl(meth)acrylate is within such ranges, then the transparent resin layer 11 bonded by pressure to the data recording layer 3 sufficiently follows the convexoconcaves of that data recording layer 3, thereby to enhance the reliability of recording and reproducing of data and also to ensure the contained amount of a nitrogen atom-containing copolymerizable monomer as will be later.

In particular, the (meth)acrylate copolymer preferably contains (methylmeth)acrylate as a monomer component, and more preferably contains methylacrylate as a monomer component. Containing methyl(meth)acrylate as a monomer component allows for improving the adhesion of the obtained transparent resin layer 11 to metal/metal oxide.

As methyl(meth)acrylate, either methylacrylate or methylmethacrylate may be used alone, or both methylacrylate and methylmethacrylate may be used in combination.

The ratio of methyl(meth)acrylate to whole monomers forming the (meth)acrylate copolymer is preferably 1 to 40 wt %, and more preferably 5 to 35 wt %. If the ratio of methyl (meth)acrylate is within such ranges, then the adhesion of the transparent resin layer 11 to the data recording layer 3 is enhanced.

It is preferred that (meth)acrylate copolymer contains a nitrogen atom-containing copolymerizable monomer as a constituent component. The nitrogen atom-containing copolymerizable monomer is a polar component, which allows for improving the adhesion of the obtained (meth)acrylate copolymer to metal/metal oxide.

Examples of nitrogen atom-containing copolymerizable monomers include, for example, acrylamide, methacrylamide, N-methylacrylamide, N-methylmethacrylamide, N-methylolacrylamide, N-methylolmethacrylamide, N-tert-butylacrylaminde, N-vinylpyrrolidone, N,N-dimethylacrylamide, N,N-diethylacrylamide, N,N-dimethylaminopropylacrylamide, N-isopropylacrylamide, N-phenylacrylamide, dimethylaminopropylacrylamide, N-vinyl caprolactam, acryloyl morpholine, monomethylaminoethyl(meth)acrylate, monoethylaminoethyl(meth)acrylate, monomethylaminopropyl(meth)acrylate, monoethylaminopropyl(meth)acrylate, dimethylaminoethyl(meth)acrylate, acryloyl piperidine, and other compounds, and each may be used alone or two or more kinds may be used in combination.

The ratio of the nitrogen atom-containing copolymerizable monomer to whole monomers forming the (meth)acrylate copolymer is preferably 0.1 to 30 wt %, more preferably 0.3 to 30 wt %, and further preferably 0.4 to 25 wt %. If the ratio of the nitrogen atom-containing copolymerizable monomer is within these ranges, then the adhesion of the transparent resin layer 11 to the data recording layer 3 is further enhanced. If, however, the ratio of the nitrogen atom-containing copolymerizable monomer exceeds 30 wt %, then the embedding capability (following capability) of the transparent resin layer 11 to the data recording layer 3 may deteriorate.

In addition, it is preferred that the (meth)acrylate copolymer contains both the above (meth)acrylate methyl and a nitrogen atom-containing copolymerizable monomer as the monomer components.

The (meth)acrylate copolymer preferably has a crosslinkable functional group in the molecule. Examples of the crosslinkable functional group include a carboxyl group, a hydroxy group, a glycidyl group, a carbon-carbon unsaturated bond, and other groups, and among them, a hydroxy group, a glycidyl group, and a carbon-carbon unsaturated bond are preferred because of not corroding the data recording layer 3. A hydroxy group and a glycidyl group each reacts with a crosslinking agent to perform cross-linking while a carbon-carbon unsaturated bond performs crosslinking by the mutual additional reaction thereof. In order to subject a carbon-carbon unsaturated bond to such additional reaction, method of irradiating an active energetic beam such as electron beam and ultraviolet ray or other method is performed. Note that, although a carboxyl group is also a crosslinkable functional group, a monomer having a carboxyl group is preferably not contained because a carboxyl group is an acidic group thereby causing the data recording layer 3 to corrode.

To introduce a hydroxyl group or a glycidyl group into the (meth)acrylate copolymer, the (meth)acrylate may be polymerized with a monomer having a hydroxyl group or glycidyl group in the molecule and being copolymerizable with the (meth)acrylate. Examples of monomers having a hydroxyl group in the molecule include, for instance, hydroxyalkyl (meth)acrylates such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth) acrylate and 4-hydroxybutyl(meth)acrylate. Examples of monomers having glycidyl groups in the molecule include, for instance, glycidyl(meth)acrylate. These monomers can be each used singly or in combinations of two or more types.

Methods for introducing functional groups having a carbon-carbon unsaturated bond into a (meth)acrylate copolymer include, for instance, reacting a (meth)acrylate copolymer with compounds having, in the molecule, carbon-carbon unsaturated bonds and having functional groups that react with the functional groups of the (meth)acrylate copolymer (hereafter referred to as "unsaturated bond-containing compounds"). The functional groups of the unsaturated bond-containing compound and the functional groups of the (meth) acrylate copolymer can be arbitrarily selected. For instance, hydroxyl groups, isocyanate groups, and glycidyl groups may be used. In a specific example, a functional group of the (meth)acrylate copolymer is a hydroxyl group and a functional group of the unsaturated bond-containing compound is an isocyanate group. Examples of the unsaturated bond-containing compound include, for instance, compounds having an isocyanate group, such as methacryloyloxyethyl isocyanate, allyl isocyanate or the like; and compounds having a glycidyl group, such as glycidyl(meth)acrylate, and each may be used singly or in combinations of two or more types.

It is preferred that the ratio of the above monomer having crosslinkable functional group in the molecule to whole monomers forming the (meth)acrylate copolymer is 0.1 to 10 wt %, and more preferred is 0.2 to 5 wt %. If the ratio of the above monomer having crosslinkable functional group in the molecule is within such ranges, then (meth)acrylate copolymer may be effectively crosslinked thereby to set the gel fraction of the transparent resin layer as being the above preferred value. Note that, when the crosslinkable functional group is carbon-carbon unsaturated bond, a monomer having crosslinkable functional group is intended to mean a monomer having been introduced therein with carbon-carbon unsaturated bond by reacting with unsaturated bond containing compound.

As desired, the (meth)acrylate copolymer may comprise, as constituent components, monomers other than the above-described monomers. Examples of such other monomers include, for instance, alkoxyalkyl(meth)acrylates such as methoxyethyl(meth)acrylate or ethoxyethyl(meth)acrylate; as well as vinyl acetate or styrene.

The above-described (meth)acrylate copolymer can be produced in accordance with known polymerization methods, for instance solution polymerization, bulk polymerization or the like using a mixture of the above-described monomers as a starting material. An azo initiator or a peroxide initiator can be used as the polymerization initiator employed for polymerization. Examples of azo initiators include, for instance, 2,2'-azobisisobutyronitrile, 2,2'-azobis-2-methyl butyronitrile, dimethyl 2,2'-azobis(2-methyl propionate), 4,4'-azobis(4-cyanovaleric acid), azobisisovaleronitrile, 2,2'-azobis(2-amidinopropane)dihydrochloride, 2,2'-azobis[2-(5-methyl-2-imidazolin-2-yl)propane]dihydrochloride, 2,2'-azobis(2-methyl propionamidine)disulfate, 2,2'-azobis(N,N-dimethylene isobutyl amidine)dihydrochloride or the like. Peroxide initiators include, for instance as dibenzoyl peroxide, tert-butyl permaleate or the like.

The amount of the polymerization initiator used is not particularly limited, but ranges ordinarily from 0.01 to 2 parts by mass with respect to 100 parts by mass of monomer component.

The weight-average molecular weight of the (meth)acrylate copolymer ranges preferably from about 200,000 to 1,800,000, more preferably from 500,000 to 1,500,000.

It is preferred that the above (meth)acrylate copolymer is crosslinked by a crosslinking agent. Crosslinking the (meth) acrylate copolymer allows for improving the strength and preservation stability of the transparent resin layer 11. Moreover, adjusting the degree of crosslinking of the (meth)acrylate copolymer enables to control the gel fraction of the transparent resin layer 11.

The crosslinking agent is appropriately selected, according to the type and other factors of the data recording layer 3 of the optical data recording medium, from ones conventionally used as a crosslinking agent in acrylic series pressure-sensitive adhesive, such as polyisocyanate compounds, epoxy resins, melamine resins, urea resins, dialdehydes, methylol polymers, metallic chelate compounds, metallic alkoxides, and metallic salts, and among them, polyisocyanate compounds are preferred.

As polyisocyanate compounds, ones having two or more isocyanate groups in the molecule may be used, such as tolylene diisocyanate or a hydride thereof; an adduct of tolylene diisocyanate and trimethylolpropane; triphenyl-methane triisocyanate; methylene bis-di-phenylisocyanate or a hydride thereof; hexamethylene diisocyanate; an adduct of hexamethylene diisocyanate and trimethylolpropane; xylylene diisocyanate; an adduct of xylene diisocyanate and trimethylolpropane; 4,4'-dicyclohexylmethane diisocyanate, or polymers of the foregoing.

If crosslinkable functional group is carbon-carbon unsaturated bond, the crosslinking agent is appropriately selected from compounds generating radicals by light and/or heat and other compounds, according to the type and other factors of the data recording layer 3 of the optical data recording medium.

The amount of the crosslinking agent used is not particularly limited, but ranges ordinarily from 0.001 to 20 parts by mass with respect to 100 parts by mass of the (meth)acrylate copolymer.

The pressure-sensitive adhesive forming the transparent resin layer 11 may also contain, for instance, an antioxidant, a tackifying resin (petroleum resin, terpene resin, rosin resin, coumarone-indene resin, phenol resin or the like), a UV absorbent, a light stabilizer, a softener, a rust inhibitor, a silane coupling agent, a filler and the like other than the (meth)acrylate copolymer and the crosslinking agent.

The antioxidant that is used can be appropriately selected from among, for instance, known hindered phenolic antioxidants, amine antioxidants, sulfur antioxidants, phosphorus antioxidants and quinone antioxidants, but a hindered phenolic antioxidant is preferably used. Corrosion of the data recording layer 3 can be effectively suppressed through the addition of such an antioxidant.

Specific examples of the antioxidant include, for instance, monocyclic phenolic antioxidants such as 2,6-di-tert-butyl-p-cresol, butylhydroxyanisole, stearyl β-(3,5-di-tert-butyl-4-hydroxyphenyl)propionate or the like; dicyclic phenolic antioxidants such as 4,4'-butylidene bis(3-methyl-6-tert-butylphenol), 3,6-dioxaoctamethylene bis[3-(3-tert-butyl-4-hydroxy-5-methyl phenyl)propionate] and the like; tricyclic phenolic antioxidants such as 1,1,3-tris(2-methyl-4-hydroxy-5-tert-butylphenyl)butane and the like; as well as tetracyclic phenolic antioxidants such as tetrakis[methylene-3-(3',5'-di-tert-butyl-4'-hydroxyphenyl)propionate]methane and the like. These antioxidants may be used singly or in combination of two or more types.

Although the usage of the antioxidizing agent is not particularly limited, it is usually 0.005 to 10 wt % in the pressure-sensitive adhesive forming the transparent resin layer 11, and preferably 0.01 to 5 wt %, and further preferably 0.1 to 3 wt %. If the usage of antioxidizing agent is 0.005 wt % or more, then the corrosion suppression effect is exhibited for the data recording layer 3. However, even if the content exceeds 10 wt %, the effect seems to scarcely be improved for the amount, and rather, there may possibly be disadvantageous from an economical viewpoint.

For the pressure-sensitive adhesive forming the transparent resin layer 11, it is preferred that the total contained amount of residual solvent and residual monomer is 100 mass ppm or less, more preferred is 50 mass ppm or less, and further preferred is 20 mass ppm or less. Thus, the residual amount of solvent and monomer is small with such an extent, thereby to allow for effectively inhibiting the corrosion of the data recording layer 3 and also suppressing the erosion to the protective sheet 12 and/or the substrate 2 of the optical data recording medium.

While the thickness of the transparent resin layer 11 is appropriately determined in accordance with the depth of the convexoconcave pattern (pre-pits and lands or grooves) formed on the substrate 2, it is usually 5 to 60 μm, and preferably 10 to 30 μm.

The protective sheet 12 in the present embodiment, which is to protect the data recording layer 3 in the optical data recording medium, forms the light receiving surface of the optical data recording medium.

Materials for the protective sheet 12 are required to have light permeability sufficient for the wavelength region of the laser used for the optical data recording medium, and a light permeable film which transmits visible light within the wavelength region of 380 to 780 nm is generally used.

As such a light permeable film, a film comprising a transparent resin, such as acrylic-based resin, polyolefin-based resin, polycarbonate-based resin, and norbornene-based resin may be used. Note, however, that the coefficient of linear expansion of the protective sheet 12 is preferably substantially the same as that of the substrate 2 in order that the optical data recording medium does not generate warpage during high temperature. Therefore, when the substrate 2 comprises polycarbonate resin, it is preferred that the protective sheet 12 also comprises polycarbonate resin.

A hardcoat layer may be provided on the surface of the light-transmitting film on the side opposite to the transparent resin layer 11. Providing such a hard coat layer protects the surface of the protective sheet 12 from scratch damages even if the optical head of the drive contacts the surface, for example.

Note that the protective sheet 12 preferably has a flat surface as much as possible so that birefringence does not readily occur. If birefringence occurs in the protective sheet 12, then the focused laser beam is degraded in the degree of focusing. Variation in the thickness also causes the degradation in the focused laser beam, and therefore, it is preferred that such a variation in the thickness is also small as much as possible.

While the thickness of the protective sheet 12 is determined in accordance with the type of the optical data recording medium, the thickness of the substrate 2 and other factors, it is usually 50 to 100 μm, and preferably 60 to 90 μm.

A known conventional release sheet 13 can be used as the release sheet 13. For instance, there can be used a resin film comprising polyethylene terephthalate, polypropylene or the like, or a release sheet resulting from subjecting such a resin film to a release treatment using a silicone-based release agent, a long-chain alkyl-based release agent, an alkyd resin-based release agent or the like.

In order to impart smoothness to the transparent resin layer 11, the surface roughness (Ra) of the release sheet 13 on the release-treated side (the side to be contacted with the transparent resin layer 11) is preferably no greater than 0.1 μm. The thickness of the release sheet 13 ranges ordinarily from about 10 to 200 μm, preferably from about 20 to 100 μm.

With respect to the adhesion of the pressure-sensitive adhesive sheet for optical data recording medium, the adhesion to a zinc oxide film as will be described later is preferably 8.0 N/25 mm or more, and more preferably 10 N/25 mm. If the adhesion is 8.0 N/25 mm or more, then the adhesion comes to be sufficient between the transparent resin layer 11 and the data recording layer 3 and thereby the delamination therebetween becomes less likely. Note that the method for measuring the adhesion will be described later as for examples.

The form of the pressure-sensitive adhesive sheet for optical data recording medium 1 according to the present embodiment is not limited. The form may be a single body, or comprise a plurality of layers. Further, the shape of the pressure-sensitive adhesive sheet is not particularly limited, and it may be configured as being roll-shaped after laminating the transparent resin layer 11 and the other base material (e.g. protective sheet 12), or configured as being interposed between two layers of peel-off films without any base material. Among them, the method of making a roll-shape is preferable because of productivity and accuracy in the thickness of the pressure-sensitive adhesive sheet.

The method for producing the pressure-sensitive adhesive sheet for optical data recording medium 1 according to the present invention is not particularly limited, and it may be obtained by, for example, preparing a coating agent containing materials forming the transparent resin layer 11 and, if needed, a solvent (e.g. ethyl acetate, toluene, 2-butanone, etc), applying the coating agent on the protective sheet 12 using a coater, such as a kiss-roll coater, a reverse-roll coater, a knife coater, a roll-knife coater, a die coater, and a spin coater; drying the coating agent to form the transparent resin layer 11; and overlaying thereafter the release-treated face of the release sheet 13 onto the surface of the transparent resin layer 11, or by preparing a coating agent in the same manner as the above; applying the coating agent onto the release-treated face of the release sheet 13; drying the coating agent to form the transparent resin layer 11; and thereafter laminating the protective sheet 12 on the surface of the transparent resin layer 11. The drying of the transparent resin layer 11 is preferably performed at a temperature of 70° C. or more, and more preferably 80° C. to 150° C. for about 10 seconds to 10 minutes.

The pressure-sensitive adhesive sheet for optical data recording medium 1 obtained in such a manner is preferably applicable to an optical data recording medium, particularly to an optical data recording medium for which the wavelength of light used for recording/reproducing is 395 to 432 nm. In this case, it is preferred that the pressure-sensitive adhesive sheet for optical data recording medium 1 excluding the release sheet 13 (the laminated body of protective sheet 12 and the transparent resin layer 11) has a light transmittance of 85% or more within the wavelength range of 395 to 432 nm. The light transmittance of 85% or more enables good transmission of the laser beam to be incident on the data recording layer of the optical data recording medium and good transmission of the reflected light from the data recording layer. The light transmittance is more preferably 90% or more.

{Optical Data Recording Medium}

Figure 2:
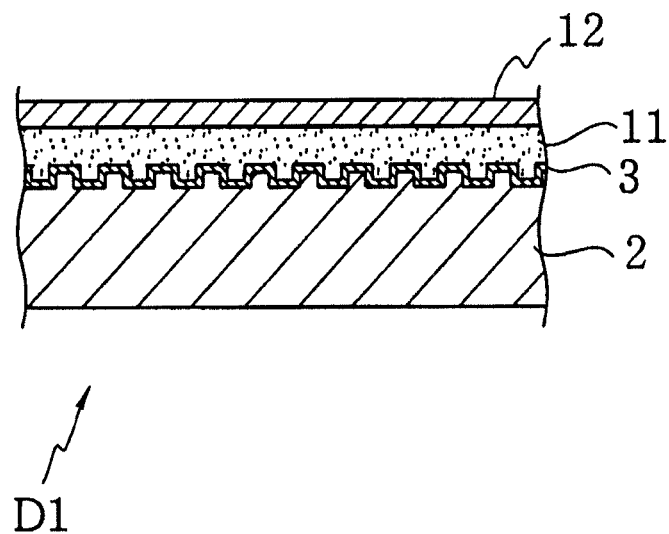
FIG. 2 is a cross-sectional view of an optical data recording medium according to one embodiment of the present invention.

FIG. 2 is a cross-sectional view of an optical data recording medium according to one embodiment of the present invention, and FIGS. 3(a) to 3(d) are views illustrating one example of a method for producing the optical data recording medium according to the embodiment.

As shown in FIG. 2, the optical data recording medium D1 according to the present embodiment is configured such that a protective sheet (protecting layer) 12, a transparent resin layer 11, an data recording layer 3, and a substrate 2 are laminated in this order from the incident plane-side (the upper surface side in FIG. 2) on which reproduction light is incident during the reproducing.

Note that, materials and other conditions for the protective sheet 12 and the transparent resin layer 11 are as heretofore described. As the substrate 2, a substrate to be usually used for an optical data recording medium may be used, which comprises polycarbonate in general and may be formed by injection forming or other forming method.

The data recording layer 3 has one or more layers adapted to a reproduction-only optical data recording medium or a recording type optical data recording medium. As layers adapted to a reproduction-only optical data recording medium, a two-layer structure is preferred which comprises a zinc oxide film and Ta film sputtered layers in this order from the reproduction light incident side, in view of practical utility including reproducing durability. On the other hand, for a recording type optical data recording medium of write-once type or rewritable type, a multilayer structure is preferred which comprises a zinc oxide film and a phase-change film consisting of GeSbTe, and other films. The structure of the data recording layer 3 in the present embodiment is, however, not limited to the above, as long as the layer has a structure which exhibits super-resolution properties.

The substrate 2 consists of polycarbonate with thickness 1.1 mm, for example. The material and the thickness of the substrate 2 are not limited to the above, as long as a certain degree of strength is obtained with such an extent that the substrate may be used as a substrate of which the surface is to be provided thereon with convexoconcaves such as pre-pits or grooves. Specifically, the substrate 2 may consist of polyolefin resin, metal, or other material, for example. Further, the substrate 2 may have a multilayer structure.

One example of a method for producing the reproducing-only optical data recording medium D1 (single-sided single-layer type) using the above pressure-sensitive adhesive sheet for optical data recording medium 1 will then be described.

Figure 3:
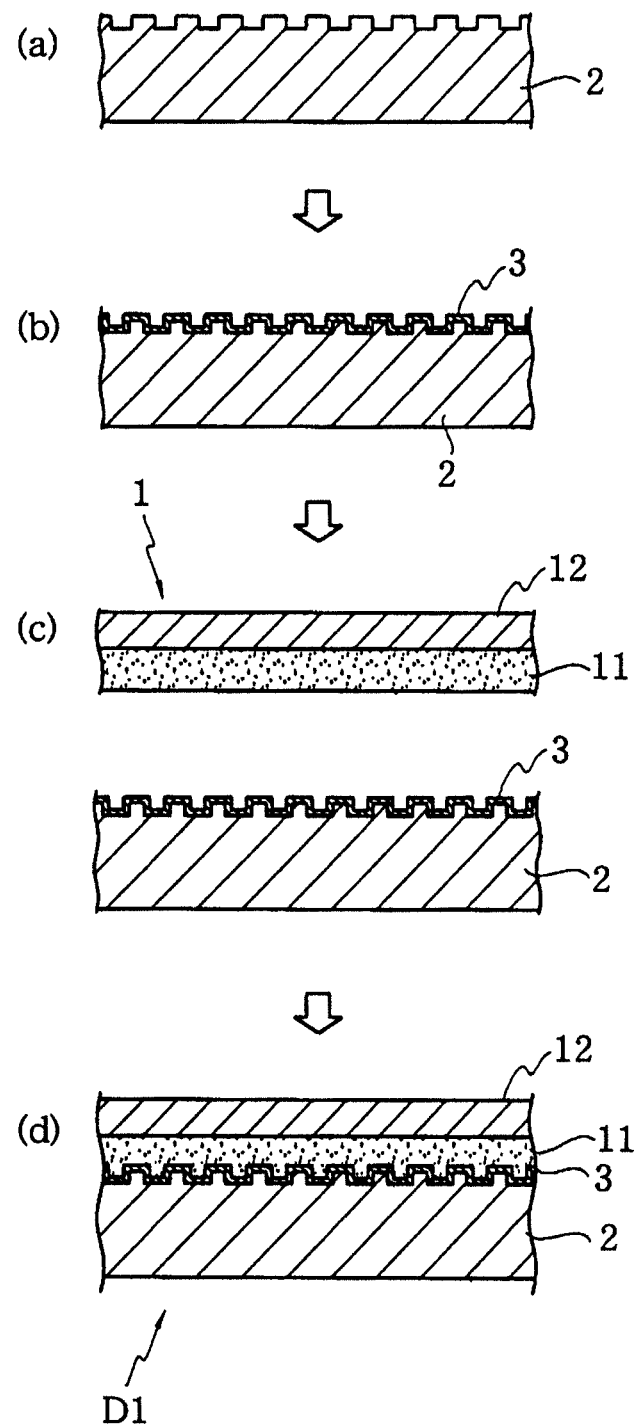
FIGS. 3(a) to 3(d) are views illustrating one example of a method for producing the optical data recording medium according to the embodiment.

First, as shown in FIG. 3(a), the substrate 2 is manufactured to have a convexoconcave pattern such as pre-pits or grooves. As shown in FIG. 3(b), the data recording layer 3 is formed on those patterns of the depressions and protrusions of the substrate 2.

The data recording layer 3 is formed by sputtering to deposit and laminate a Ta film (7 nm) and a zinc oxide film (60 nm) on the convexoconcave pattern of the substrate 2.

Then, as shown in FIG. 3(c), the release sheet 13 is removed from the pressure-sensitive adhesive sheet for optical data recording medium 1 to expose the transparent resin layer 11, and thereafter the transparent resin layer 11 is press-bonded to the surface of the data recording layer 3 on the substrate 2, as shown in FIG. 3(d).

According to the optical data recording medium D1 obtained in such a manner, even if it is left under high temperature and/or high humidity or even in a case in which there occur rapid temperature changes and/or humidity changes, the data recording layer 3 adjacent to the transparent resin layer 11 is prevented from cracking or other troubles, thereby being stable for changes in the external environment. Moreover, the data recording layer 3 is made less likely to be corroded when the (meth)acrylate copolymer forming the transparent resin layer 11 does not contain any acidic group. Therefore, the above pressure-sensitive adhesive sheet for optical data recording medium 1 allows obtaining an optical data recording medium D1 having high reliability without any problem in recording/reproducing functionality for data. This optical data recording medium D1 is suitable for a super-resolution medium.

The above-described optical data recording medium and method for producing the optical data recording medium are merely for one example, and the present invention is not limited to the above medium and method. For example, according to the above embodiments, the above optical data recording medium D1 is of single-sided single-layer type, but single-sided double-layer type or multi (more than two)-layer type may also be applicable.

Moreover, although in the above embodiments the pressure-sensitive adhesive which forms the transparent resin layer 11 of the pressure-sensitive adhesive sheet for optical data recording medium 1 has been preliminarily made to have a layer-like form and the obtained layer is used as a constituent of the pressure-sensitive adhesive sheet for optical data recording medium 1, the transparent resin layer 11 may alternatively be made to have liquid-like form by a method such as melting and dissolving in a solvent, and then the pressure-sensitive adhesive sheet for optical data recording medium may be formed on the data recording layer 3 by spin-coat method or other method.

Furthermore, although in the above embodiments the description has been presented for examples of the pressure-sensitive adhesive sheet for optical data recording medium for forming the protective layer of the optical data recording medium, a pressure-sensitive adhesive sheet for optical data recording medium may be manufactured to have a transparent resin layer 11 but have no protective sheet 12, and the transparent resin layer 11 of the pressure-sensitive adhesive sheet for optical data recording medium may be used for bonding together two substrates provided each with an data recording layer.

{Method for Reproducing Data from Optical Data Recording Medium}

In the method for reproducing data from the optical data recording medium according to the present embodiment, the above optical data recording medium is used as a super-resolution medium.

Since the above optical data recording medium is used as a super-resolution medium in this method for reproducing data from the optical data recording medium, the focusing means may be simplified compared to that for conventional super-resolution media, and the power consumption of a reproducing device may be reduced because the reproducing may be sufficiently performed even if the reproduction laser power is set as being lower value than that for conventional super-solution media.

{Device for Driving Optical Data Recording Medium}

In the device for driving the optical data recording medium according to the present embodiment, the above optical data recording medium is used as a super-resolution medium.

According to this device for driving an optical data recording medium, the above optical data recording medium is used as a super-resolution medium, and therefore, the focusing means may be simplified compared to that for conventional super-resolution media which has a relatively low reflectivity, and the power consumption of a reproducing device may be reduced because the reproducing may be sufficiently performed even if the reproduction laser power is set as being lower value than that for conventional super-solution media. Moreover, in a case where a means is provided in which reproduction is retried with increasing the reproduction laser power when a focus error occurs, the reliability of focusing is improved while minimizing the cost rise, because the focusing is allowed to be easily achieved even if the gain adjustment for the light-receiving element is maintained as conventional one.

The above embodiments have been described so as to facilitate comprehension the present invention, but the embodiments do not to limit the present invention in any way. Therefore, the features disclosed in the above embodiments are meant to encompass all design variations and equivalents within the technical scope of the present invention.

For example, the release sheet 13 in the pressure-sensitive adhesive sheet for optical data recording medium 1 may be omitted.

EXAMPLES

The present invention will be more specifically described with reference to examples, but the scope of the present invention is not to be limited to these examples.

Example 1

A method for preparing a pressure-sensitive adhesive sheet for optical data recording medium of Example 1 will be described below.

First, 68.5 parts by mass of n-butyl acrylate, 30 parts by mass of methyl acrylate, 1 part by mass of 2-hydroxyethyl acrylate, and 0.5 parts by mass of acrylamide as monomer components; and 0.2 parts by mass of azobisisobutyronitrile as an initiator were added to 200 parts by mass of ethyl acetate and stirred at 60° C. during 17 hours thereby to obtain a solution of acrylate copolymer. Note that the weight average molecular weight of the obtained acrylate copolymer was 600,000.

Then, 0.6 parts by mass, on solids basis, of a xylene diisocyanate-based trifuctional adduct of and trimethylolpropane (TD-75 by Soken Chemical & Engineering Co., Ltd.), as a crosslinking agent, were added to 100 parts by mass, on solids basis, of the obtained solution of acrylate copolymer, and the whole was diluted in 2-butanone to a concentration of 25 wt %, to obtain a solution of pressure-sensitive adhesive.

This solution of pressure-sensitive adhesive was coated, using a knife coater, onto the release-treated face of a release sheet (SP-PET 381031 by Lintec Corp., obtained by treating a polyethylene terephthalate film with a release treatment using a silicone resin release agent), followed by drying at 90° C. for 1 minute, to form a 25 μm-thick transparent resin layer.

Next, a polycarbonate film (Pure-Ace C110-75, thickness: 75 μm, by TEIJIN Ltd.), as a protective sheet, was laminated onto the transparent resin layer, Thus, a pressure-sensitive adhesive sheet for optical data recording medium of Example 1 was obtained with thickness of 138 μm.

Example 2

A method for preparing a pressure-sensitive adhesive sheet for optical data recording medium of Example 2 will be described below.

A pressure-sensitive adhesive sheet for optical data recording medium of Example 2 was obtained with thickness of 138 μm by performing the same processes as those for Example 1 except that a different acrylate copolymer which had been obtained to involve 78.5 parts by mass of n-butyl acrylate and 20 parts by mass of methyl acrylate was used. Note that the weight average molecular weight of the obtained acrylate copolymer was 650,000.

Example 3

A method for preparing a pressure-sensitive adhesive sheet for optical data recording medium of Example 3 will be described below.

A pressure-sensitive adhesive sheet for optical data recording medium of Example 3 was obtained with thickness of 138 μm by performing the same processes as those for Example 1 except that a different acrylate copolymer which had been obtained to involve 78.5 parts by mass of n-butyl acrylate and 20 parts by mass of methyl acrylate was used, and that the additive amount of xylylenediisocyanate-based crosslinking agent was changed to 1.2 parts by mass. Note that the weight average molecular weight of the obtained acrylate copolymer was 650,000.

Example 4

A method for preparing a pressure-sensitive adhesive sheet for optical data recording medium of Example 4 will be described below.

A pressure-sensitive adhesive sheet for optical data recording medium of Example 4 was obtained with thickness of 138 μm by performing the same processes as those for Example 1 except that the additive amount of xylylenediisocyanate-based crosslinking agent was changed to 0.3 parts by mass. Note that the weight average molecular weight of the obtained acrylate copolymer was 600,000.

Comparative Example 1

A method for preparing a pressure-sensitive adhesive sheet for optical data recording medium of Comparative Example 1 will be described below.

A pressure-sensitive adhesive sheet for optical data recording medium of Comparative Example 1 was obtained with thickness of 138 μm by performing the same processes as those for Example 1 except that the additive amount of xylylenediisocyanate-based crosslinking agent was changed to 1.2 parts by mass. Note that the weight average molecular weight of the obtained acrylate copolymer was 550,000.

Comparative Example 2

A method for preparing a pressure-sensitive adhesive sheet for optical data recording medium of Comparative Example 2 will be described below.

A pressure-sensitive adhesive sheet for optical data recording medium of Comparative Example 2 was obtained with thickness of 138 μM by performing the same processes as those for Example 1 except that a different acrylate copolymer which had been obtained to involve 78.5 parts by mass of n-butyl acrylate and 20 parts by mass of methyl acrylate was used, and that the additive amount of xylylenediisocyanate-based crosslinking agent was changed to 0.3 parts by mass. Note that the weight average molecular weight of the obtained acrylate copolymer was 600,000.

Comparative Example 3

A method for preparing a pressure-sensitive adhesive sheet for optical data recording medium of Comparative Example 3 will be described below.

A pressure-sensitive adhesive sheet for optical data recording medium was obtained of Comparative Example 3 with thickness of 138 μm by performing the same processes as those for Example 1 except that a different acrylate copolymer which had been obtained to involve 77 parts by mass of n-butyl acrylate, 20 parts by mass of ethyl acrylate, and 3 parts by mass of acrylic acid was used. Note that the weight average molecular weight of the obtained acrylate copolymer was 540,000.

Reference Example 1

As an example of a common light transparent layer for optical data recording medium (cover layer for optical disc), a cover layer was formed by coating an ultraviolet curable resin (MP107, by Mitsubishi Rayon Co., Ltd.) by spin coating onto an data recording layer formed on a polycarbonate substrate as will be described later in Test Example 6, and thereafter irradiating ultraviolet rays and curing.

There will be described in detail for storage elastic modulus, gel fraction, corrosion resistance, crack resistance, and adhesion measurement with the aforementioned pressure-sensitive adhesive sheet for optical data recording medium, and for evaluation of signal characteristics with the optical data recording medium using the aforementioned pressure-sensitive adhesive sheet for optical data recording medium.

Test Example 1

Measurement of Storage Elastic Modulus

A transparent resin layer with thickness 2.5 mm was formed by overlapping the transparent resin layers of the pressure-sensitive adhesive sheets for optical data recording medium prepared for each of examples and comparative examples.

Each storage elastic modulus (Pa) at 23° C. of the formed transparent resin layer was measured at 1 Hz using a viscoelasticity measuring instrument (DYNAMIC ANALYZER RDA II, by Rheometrics Inc.). The results are shown in Table 1.

Test Example 2

Measurement of Gel Fraction

Each pressure-sensitive adhesive solution prepared in the examples and the comparative examples was coated, using a knife coater, onto the release-treated face of a tight release force type release sheet (SP-PET 381031 by Lintec Corp., obtained by treating a polyethylene terephthalate film with release treatment using a silicone resin-based release agent), followed by drying at 90° C. for 1 minute, to form a 25 μm-thick transparent resin layer. Next, an easy release force type release sheet (SP-PET 38GS by Lintec Corp., obtained by treating a polyethylene terephthalate film with release treatment using a silicone resin-based release agent), was laminated on each transparent resin layer, to prepare samples.

Each obtained sample was left to stand for one week at conditions of 23° C. and relative humidity of 50%. Thereafter, the transparent resin layer was peeled off the release sheets, and the weight of the pressure-sensitive adhesive was measured. The pressure-sensitive adhesive was extracted through refluxing for about 16 hours with ethyl acetate using a Soxhlet extractor. After extraction, the undissolved fraction component was air-dried, followed by drying at 100° C. for 10 hours, and the resulting was then humidity-conditioned by being left to stand for 3 hours under conditions of 23° C. and relative humidity 50%. The weight of the undissolved fraction component at that time was measured, and the gel fraction was measured according to the formula below. The results are shown in Table 1.

Gel fraction(%)=(weight of undissolved component after drying and humidity conditioning/weight of the pressure-sensitive adhesive before extraction)×100

Test Example 3

Corrosion Resistance Test [Measurement of Transmittance Change Rate]

<Corrosion Resistance Test by Heat>

Each pressure-sensitive adhesive sheet for optical data recording medium produced for examples and comparative examples was applied via the transparent resin layer to a glass plate sputtered thereon with zinc oxide layer so as to prepare each sample. Note that the condition at that time of the pressure-sensitive adhesive sheet for optical data recording medium was defined to be an initial condition.

For the obtained sample, initial transmittance Ta1 was measured with light of a wavelength of 405 nm. Specifically, light of a wavelength of 405 nm was irradiated for the sample from the protective sheet-side using a UV-visible spectrophotometer (UV-3100PC, by SHIMADZU Corp.) to measure the transmittance.

Subsequently, the sample was next left to stand for 500 hours in an environment at a temperature of 80° C., and transmittance Tb1 was then measured with light of a wavelength of 405 nm in the same manner as the above. Thereafter, the transmittance change rate (Y1; %) was worked out on the basis of the formula below. Note that the preferable value of transmittance change rate for an optical data recording medium is 0.5% or less. The results are shown in Table 1.

$Y1(\%)=[(Ta1-Tb1)/Ta1]\times 100$

<Corrosion Resistance Test by Heat and Humidity>

Each pressure-sensitive adhesive sheet for optical data recording medium produced for examples and comparative examples was applied via the transparent resin layer to a glass plate sputtered thereon with zinc oxide layer to prepare each sample. Note that the condition at that time of the pressure-sensitive adhesive sheet for optical data recording medium was defined to be an initial condition.

For the obtained sample, initial transmittance Ta2 was measured with light of a wavelength of 405 nm. Specifically, light of a wavelength of 405 nm was irradiated for the sample from the protective sheet-side using a UV-visible spectrophotometer (UV-3100PC, by SHIMADZU Corp.) to measure the transmittance.

Subsequently, the sample was next left to stand for 500 hours in an environment at a temperature of 60° C. and relative humidity 85%, transmittance Tb2 was then measured with light of a wavelength of 405 nm in the same manner as the above, followed by working out obtain the transmittance change rate (Y2; %) on the basis of the formula below. Note that the preferable value of transmittance change rate for an optical data recording medium is 0.5% or less. The results are shown in Table 1.

$Y2(\%)=[(Ta2-Tb2)/Ta2]\times 100$

Test Example 4

Crack Resistance Test

<Crack Resistance Test by Heat>

Each pressure-sensitive adhesive sheet for optical data recording medium produced for examples and comparative examples was applied via the transparent resin layer onto a sputtered film surface on a polycarbonate plate (thickness: 1.2 mm) formed thereon with Ta film (7 nm) and zinc oxide film (60 nm) in this order by sputtering, thus providing each sample.

The obtained sample was left to stand for 70 hours in an environment of 80° C., and the resulting was then moved immediately and left to stand for 24 hours in an environment of 23° C. and relative humidity 65%. Thereafter, the zinc oxide film was observed using digital microscope (UV-3100PC, by KEYENCE CORPORATION) for observing the occurrence status of cracks thereby to evaluate the sample in accordance with the following criteria. The results are shown in Table 1.

◯: no change compared to the initial condition (no crack occurs)

Δ: cracks partially occur

X: cracks entirely occur

<Crack Resistance Test by Heat and Humidity>

Each pressure-sensitive adhesive sheet for optical data recording medium produced for examples and comparative examples was applied via the transparent resin layer onto a sputtered film surface on a polycarbonate plate (thickness: 1.2 mm) formed thereon with Ta film (7 nm) and zinc oxide film (60 nm) in this order by sputtering, thus providing each sample.

The obtained sample was left to stand for 70 hours in an environment of 60° C. and relative humidity 85% and the resulting was then moved immediately and left to stand for 24 hours in an environment of 23° C. and relative humidity 65%. Thereafter, the zinc oxide film was observed using digital microscope (UV-3100PC, by KEYENCE CORPORATION) for observing the occurrence status of cracks thereby to evaluate the sample in accordance with the following criteria. The results are shown in Table 1.

◯: no change compared to the initial condition (no crack occurs)

Δ: cracks partially occur

X: cracks entirely occur

Test Example 5

Measurement of Adhesion

Ta film (7 nm) and zinc oxide film (60 nm) were formed in this order on a polycarbonate plate (thickness: 1.1 mm) by sputtering. After cutting the pressure-sensitive adhesive sheet for optical data recording medium produced in the examples and comparative examples into pieces of a width of 25 mm and a length of 100 mm, each piece was attached to the above zinc oxide film while releasing the release sheet, using a laminator, thereby providing each sample.

The obtained sample was left to stand for 24 hours under the condition of 23° C. and relative humidity 50%, and the pressure-sensitive adhesive sheet for optical data recording medium was then peeled off the zinc oxide film using a universal tensile tester (Tensilon, by Orientec Co., Ltd.) under the condition of peeling speed of 300 mm/min and peeling angle being 180°, while the adhesion (N/25 mm) was measured. The results are shown in Table 1.

Test Example 6

Evaluation of Signal Characteristics

Zinc oxide film (60 nm) and Ta film (7 nm) were formed by sputtering as the data recording layer 3 on a polycarbonate substrate provided thereon with 1-7 modulated random patterns having a minimum pit length of 94 nm, and the pressure-sensitive adhesive sheet for optical data recording medium produced each in Examples 1, 2 and 4 and Comparative Example 2 was attached as a cover layer so as to abut the data recording layer 3, thereby providing each sample disc. In addition, a laminate of the polycarbonate substrate prepared in Reference Example 1 and the cover layer was prepared as a comparative sample disc.

The above sample discs were subjected to reproduction using a disc evaluation system (DDU-1000, by PULSTEC INDUSTRIAL CO., LTD.) having a semiconductor laser capable of emitting laser beam of a wavelength of 405 nm and an optical system with an N.A. (numerical aperture) of 0.85, and reproduced signals obtained for each reproduction laser power were decoded with PRML (12221) thereby being given for a calculation of bER (bit error rate) for each sample disc with each laser power. In addition, during the above reproduction, a reflectance at the reproduction wavelength was obtained for each sample disc.

As a result, the bERs at 0.7 mW of reproduction laser power of the sample discs of Examples 1, 2 and 4, Comparative Example 2, and Reference Example 1 were $1.4 \times 10^{-4}$, $2.0 \times 10^{-5}$, $2.3 \times 10^{-4}$, $1.2 \times 10^{-4}$, and $1.4 \times 10^{-4}$, respectively; the bERs at 0.5 mW of reproduction laser power were $8.4 \times 10^{-4}$, $1.1 \times 10^{-3}$, $1.2 \times 10^{-3}$, $1.6 \times 10^{-3}$, and $1.0 \times 10^{-3}$, respectively; and $2.9 \times 10^{-3}$, the bERs 0.4 mW of reproduction laser power were $4.2 \times 10^{-3}$, $3.4 \times 10^{-3}$, $3.8 \times 10^{-3}$, and $3.0 \times 10^{-3}$, respectively, and substantially no difference was confirmed among the reproduction sensitivities, considering the tendency of the bERs obtained in the range from 0.7 mW of reproduction laser power where the bER achieved approximately the bottom value, to 0.4 mW of reproduction laser power where the bER corresponded to the rising area.

Moreover, comparing sample discs of Examples 1, 2 and 4, Comparative Example 2, and Reference Example 1, only the reflectivity of Reference Example 1 was approximately 4% when reproduction laser power was 0.5 mW, which was lower than the values of reflectivity of other samples (5.0% to 5.4%). On the other hand, the values of reflectivity of the sample discs in Examples 1, 2 and 4, and Comparative Example 2 increased as the reproduction laser power increased. As a result, Examples 1, 2 and 4, and Comparative Example 2 were similar in reproduction sensitivity and higher in terms of reflectivity comparing with Reference Example 1 as being a common cover for optical disc.

Note that a super-resolution optical data recording medium exhibits a lower reflectivity in general, because light is absorbed while performing super-resolution reproduction. Therefore, it is not easy for such a medium to constantly achieve a required reflectivity at the time of producing. Thus, Examples 1, 2 and 4, and Comparative Example 2, each having a similar reproduction sensitivity to Reference Example 1 as a common cover material for optical disc, have more advantages in the production margin for super-resolution optical data recording medium than Reference Example 1 because of high reflectivity.

Moreover, comparing in the same manner the sample discs of Example 3 and Comparative Example 1 with the sample disc of Reference Example 1 in terms of reproduction sensitivity and reflectivity, Example 3 and Comparative Example 1 were confirmed to be better by 0.2 mW than the sample disc of Reference Example 1, and the values of reflectivity thereof were also confirmed to be improved as similar to the other samples and to increase in accordance with the increased reproduction laser power.

Note that the sample disc of Comparative Example 3 was set aside from objectives for the evaluation of signal characteristics, because the sample disc significantly deteriorated in the above corrosion resistance test.

The aforementioned results were evaluated in accordance with the following criteria to be shown in Table 1.

<Reproduction Sensitivity>
◎: better than Reference Example 1 (capable of signal reproduction from lower reproduction laser power)
○: comparable with Reference Example 1 (capable of signal reproduction from comparable reproduction laser power)
X: worse than Reference Example 1 (capable of signal reproduction from higher reproduction laser power)
<Reflectivity>
○: higher than Reference Example 1
Δ: comparable with Reference Example 1
X: lower than Reference Example 1

TABLE 1

|  |  | Example 1 | Example 2 | Example 3 | Example 4 | Comparative Example 1 | Comparative example 2 | Comparative example 3 | Reference example 1 |
|---|---|---|---|---|---|---|---|---|---|
| Storage elastic modulus (23° C.): [$\times 10^5$ Pa] | | 1.5 | 1.3 | 1.2 | 0.9 | 1.8 | 1.2 | 1.4 | — |
| Gel fraction: [%] | | 74 | 78 | 83 | 68 | 84 | 63 | 71 | — |
| Corrosion resistance test: [%] | 80° C., 500 Hrs | 0.40 | 0.25 | 0.18 | 0.24 | 0.63 | 0.42 | 0.32 | — |
| | 60° C., 85% RH, 500 Hrs | 0.25 | 0.32 | 0.17 | 0.11 | 0.44 | 0.20 | 1.78 | — |
| Crack resistance test | 80° C., 70 Hrs | ○ | ○ | ○ | ○ | ○ | ○ | ○ | — |
| | 60° C., 85% RH, 70 Hrs | Δ | ○ | ○ | ○ | X | ○ | ○ | — |
| Adhesion: [N/25 mm] | | 20.5 | 16.1 | 11.0 | 19.9 | 18.0 | 19.1 | 10.2 | — |

TABLE 1-continued

|  |  | Example 1 | Example 2 | Example 3 | Example 4 | Comparative Example 1 | Comparative example 2 | Comparative example 3 | Reference example 1 |
|---|---|---|---|---|---|---|---|---|---|
| Evaluaton of signal characteristics | Reproduction sensitivity | ○ | ○ | ◉ | ○ | ◉ | X | — | ○ (Reference) |
|  | Reflectivity | ◉ | ◉ | ◉ | ◉ | ◉ | ◉ | — | ○ (Reference) |

As understood from Table 1, according to the pressure-sensitive adhesive sheet for optical data recording medium obtained in the examples, the zinc oxide film was prevented from being corroded even in a high temperature and/or high humidity environment, and there occurred no crack in the zinc oxide film even under rapid changes in temperature and/or humidity. Moreover, the adhesion of the transparent resin layer to the zinc oxide film was sufficient. Furthermore, regarding the results of the evaluation of signal characteristics, the optical data recording medium produced by using the pressure-sensitive adhesive sheet for optical data recording medium according to the examples provides good bER value and is allowed to obtain a higher reflectivity than that of Reference Example 1 as being a common cover layer material for optical disc while maintaining a reproduction sensitivity similar to that of Reference Example 1, and therefore the production margin is improved without sacrificing the reproduction sensitivity and/or reliability by using the pressure-sensitive adhesive sheet for optical data recording medium obtained as the examples.

INDUSTRIAL APPLICABILITY

The present invention is usefully applicable to producing a super-resolution medium which has an excellent durability even under rapid environment changes and has high reliability, and also applicable to such a super-resolution medium.

DESCRIPTION OF REFERENCE NUMERALS

1 . . . pressure-sensitive adhesive sheet for optical data recording medium
11 . . . transparent resin layer
12 . . . protective sheet (protective layer)
13 . . . release sheet
2 . . . substrate
3 . . . data recording layer
D1 . . . optical data recording medium

The invention claimed is:

1. A pressure-sensitive adhesive sheet for an optical data recording medium from which a signal with a mark length shorter than a resolution limit of an optical system of a reproducing device is capable of being reproduced by reproduction light irradiated during reproducing,
the pressure-sensitive adhesive sheet having an adhesive transparent resin layer to be disposed on an data recording layer of the optical data recording medium,
the transparent resin layer having a (meth)acrylate copolymer containing no acidic group as a main component,
the transparent resin layer having a storage elastic modulus at 23° C. of $1.5 \times 10^5$ Pa or less and a gel fraction of 68 wt % or more.

2. The pressure-sensitive adhesive sheet for an optical data recording medium according to claim 1, wherein the (meth)acrylate copolymer contains methyl (meth)acrylate as a monomer component.

3. The pressure-sensitive adhesive sheet for an optical data recording medium according to claim 1, wherein the (meth)acrylate copolymer includes a nitrogen atom-containing copolymerizable monomer as a monomer component.

4. The pressure-sensitive adhesive sheet for an optical data recording medium according to claim 1, further comprising a protective layer.

5. An optical data recording medium, wherein the pressure-sensitive sheet for the optical data recording medium described in claim 1 is disposed on an data recording layer.

6. The optical data recording medium according to claim 5, wherein a protective layer, the transparent resin layer, the data recording layer, and a substrate are disposed in layers in this order from an incident plane side on which reproduction light is incident during reproducing.

7. A method for reproducing data from an optical data recording medium, the method using the optical data recording medium described in claim 5.

8. A device for driving an optical data recording medium, the device using the optical data recording medium described in claim 5.

9. The pressure-sensitive adhesive sheet for an optical data recording medium according to claim 2, wherein the (meth)acrylate copolymer includes a nitrogen atom-containing copolymerizable monomer as a monomer component.

10. The pressure-sensitive adhesive sheet for an optical data recording medium according to claim 2, further comprising a protective layer.

11. The pressure-sensitive adhesive sheet for an optical data recording medium according to claim 3, further comprising a protective layer.

12. An optical data recording medium, wherein the pressure-sensitive sheet for the optical data recording medium described in claim 2 is disposed on an data recording layer.

13. An optical data recording medium, wherein the pressure-sensitive sheet for the optical data recording medium described in claim 3 is disposed on an data recording layer.

14. An optical data recording medium, wherein the pressure-sensitive sheet for the optical data recording medium described in claim 4 is disposed on an data recording layer.

15. A method for reproducing data from an optical data recording medium, the method using the optical data recording medium described in claim 6.

16. A device for driving an optical data recording medium, the device using the optical data recording medium described in claim 6.

* * * * *